(12) United States Patent
Grinberg et al.

(10) Patent No.: US 7,368,905 B2
(45) Date of Patent: May 6, 2008

(54) SYSTEM, METHOD, AND APPARATUS FOR USE OF MICRO COILS WITHIN A SINGLE SLIDER TEST NEST

(75) Inventors: Serge Grinberg, Saratoga, CA (US); Jimmy Luong, San Jose, CA (US); Kenneth Donald Mackay, San Jose, CA (US); Frederick W. Stukey, Jr., deceased, late of Morgan Hill, CA (US); by Lisa Stukey, legal representative, Morgan Hill, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 219 days.

(21) Appl. No.: 10/954,855

(22) Filed: Sep. 30, 2004

(65) Prior Publication Data

US 2006/0066298 A1    Mar. 30, 2006

(51) Int. Cl.
*G01R 33/12* (2006.01)
(52) U.S. Cl. ........................................ 324/210; 324/235
(58) Field of Classification Search ................ 324/210, 324/235, 212; 360/323, 324.1
See application file for complete search history.

(56) References Cited

U.S. PATENT DOCUMENTS

| | | | |
|---|---|---|---|
| 3,710,235 A | 1/1973 | Barrager et al. | |
| 5,821,746 A | 10/1998 | Shelor | |
| 5,926,019 A | 7/1999 | Okumura | |
| 6,275,028 B1 | 8/2001 | Matsui et al. | |
| 6,275,032 B1 * | 8/2001 | Iwata et al. | 324/243 |
| 6,486,660 B1 | 11/2002 | Luse et al. | |
| 6,534,974 B1 | 3/2003 | Bowen et al. | |
| 6,553,644 B2 | 4/2003 | Karmaniolas et al. | |
| 6,707,631 B1 * | 3/2004 | Haddock | 360/75 |
| 6,714,006 B2 | 3/2004 | Mackay et al. | |

FOREIGN PATENT DOCUMENTS

| | | | |
|---|---|---|---|
| JP | 60164915 | | 8/1985 |
| JP | 01216550 A | * | 8/1989 |
| JP | 2233388 | | 9/1990 |
| JP | 9016928 | | 1/1997 |
| JP | 2002216326 | | 9/2002 |

OTHER PUBLICATIONS

"Static Tester for Thin Film Magnetic Heads", IBM Technical Disclosure Bulletin, Jan. 1973, p. 2618, 73C 00497 / 02-350, 02-725, 34-700 / UK8720021.

* cited by examiner

*Primary Examiner*—Reena Aurora
(74) *Attorney, Agent, or Firm*—Bracewell & Giuliani LLP

(57) ABSTRACT

A precisely machined test nest holds a single hard disk drive slider. The test nest is fabricated to contain a micro pickup coil that is positioned to be able to detect magnetic flux from a write element of the slider. The micro pickup coil has highly repeatable and controllable positioning with respect to the write element. This technique also allows local magnetic field to be applied to the read element, and its small size allows excitation at higher frequencies than are currently achievable today. The coil is lithographically defined and integrated into the test nest and used on single slider testers. The low inductance of the coil allows it to be driven at high frequencies. Its position within the test nest ensures good heat sinking and enables large current pulses to be employed.

25 Claims, 1 Drawing Sheet

SYSTEM, METHOD, AND APPARATUS FOR USE OF MICRO COILS WITHIN A SINGLE SLIDER TEST NEST

BACKGROUND OF THE INVENTION

1. Technical Field

The present invention relates in general to improved testing during single slider processing and, in particular, to an improved system, method, and apparatus for using micro coils within a test nest for testing individual sliders.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

There have been many attempts to detect magnetic flux from slider write heads in order to determine and assess (i.e., characterize) the write efficiency of a head without actually having to fly it on a disk. Many of such attempts involve the use of a pickup coil placed close to the write element. The results from these measurements are extremely sensitive to the detailed placement of the coil, and to extraneous pickup in the rest of the wiring. In particular, these prior art designs have all had problems with positioning of the coil and control of cross-talk between source and detector. Because of these shortcomings, they are unsuitable for manufacturing testing. Thus, an improved system for detecting magnetic flux in write heads for the previously described purposes would be desirable.

SUMMARY OF THE INVENTION

In single slider quasi testing, there is a small, precisely machined test nest into which each slider is placed. This test nest is used to make electrical contact with the slider pads thereby allowing electrical tests to be performed on the slider. In one embodiment of the present invention, the test nest is fabricated to contain a micro pickup coil that is positioned to be able to detect flux from the write element of the slider. Such a design gives the micro pickup coil repeatable and controllable positioning with respect to the write element. The coil can also be used to generate fields at high frequency that can be detected using the write coil as a pick-up device. This technique also allows local magnetic fields to be applied to the read element. Its small size allows excitation of the read element at higher frequencies than are currently achievable today.

The present invention may be embodied as one or more coils, an array of coils, an array of loops, or an array of wires. These designs are lithographically defined and integrated into the test nest used on single slider testers. This technique is especially useful for perpendicular heads where the magnetic write flux is less confined close to the pole tip, and for controlling cross-talk between source and detector. The low inductance of these designs allows them to be driven at high frequencies. Their position within the test nest ensures good heat sinking and enables large current pulses to be employed.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
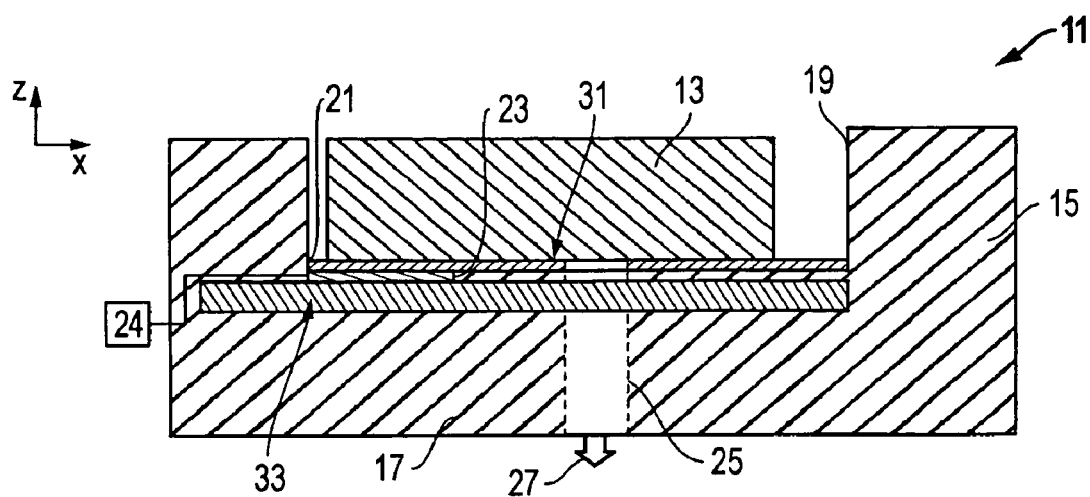
FIG. 1 is a sectional side view of one embodiment of a test device and system constructed in accordance with the present invention.
Figure 2:
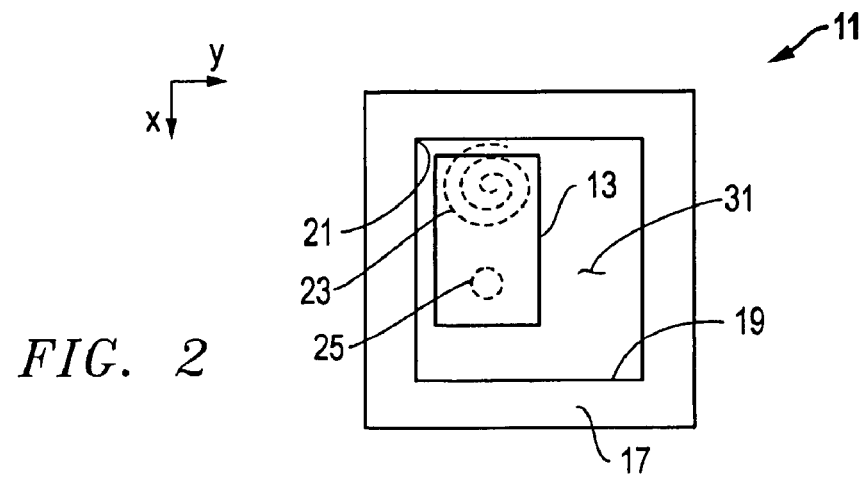
FIG. 2 is a top view of the test device and system of FIG. 1.
Figure 3:
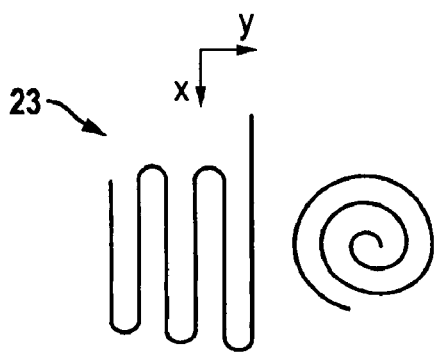
FIG. 3 is a top view of alternate embodiments of coil patterns employed by the test device and system of FIG. 1.

Referring to FIGS. 1-3, one embodiment of a system, method, and apparatus for testing a workpiece is shown. The present invention 11 is well suited for testing individual sliders 13, such as hard disk drive sliders, for magnetic data storage and retrieval devices. The invention is designed to assess the write efficiency of a write element of the slider 13 without flying the slider on a disk. The sliders 13 are generally rectangular, block-like shapes having read elements and write elements for reading data from and writing data to, respectively, a magnetic storage media disk. Each slider 13 defines x, y, and z-directions, as shown in the appended figures.

A test device 15 of the present invention has a body 17, and a nest 19 that is formed in the body 17. Like the slider 13, the nest 19 may be provided with a rectangular, block-like shape to better accommodate the congruent shape of the slider 13. The nest 19 has a reference corner 21 that precisely aligns the workpiece or slider 13 with respect to the nest 19 in all of the x, y, and z-directions. In one embodiment, the reference corner 21 aligns the slider 13 within +/−5 μm (or less, such as +/1 μm) of a desired alignment with respect to a test element 23 (described below) in all of the x, y, and z-directions. The purpose of the test nest is to firmly hold and locate the slider to allow electrical contact to be made with the slider via contact pads on the slider body. Electrical contact is made with both the read and write elements.

The test element 23 is formed in the body 17, preferably directly beneath the nest 19. The test element 23 is precisely located adjacent the reference corner 21 for testing the slider 13 when the slider 13 is mounted in the nest 19 and precisely aligned with respect to the reference corner 21. The test element 23 couples with and tests the slider 13 with a high frequency magnetic test field and also detects stray magnetic flux from a write element of the slider 13.

The test element 23 may comprise one or more of many different forms. For example, as shown in FIG. 3, the test element 23 may comprise one or more coils, an array of coils, an array of loops, or an array of wires having a variety of different geometries. The test element 23 may be formed as a patterned copper layer (e.g., by lithography) or by other methods and materials. In one embodiment, the test element 23 has 1 μm traces at a spacing of 1.5 μm for conducting approximately 50 mA (e.g., via source 24) to produce a magnetic field of approximately 200 Oe.

In one embodiment, an evacuated hole 25 is formed in the body 17 and extends to the nest 19 for securing the slider 13 in the nest 19 via a vacuum 27 during testing or operation. In addition, a wear layer 31 may be formed in the nest 19 between the slider 13 and the test element 23 for protecting the test element 23 from wear. The wear layer 31 may cover the entire lower surface of the nest 19 or just a portion of it. In one version, the wear layer 31 is formed from $Al_2O_3$ and has a thickness of no more than 1 μm.

The present invention may further comprise a heat sink substrate 33 formed in the body 17 adjacent the test element 23 but opposite the nest 19 as shown for cooling the body 17, the test element 23, and the slider 13 in operation. In one embodiment, the body is formed from a ceramic or stainless steel, the test element 23 is copper, and the heat sink substrate 33 is silicon. As shown in FIG. 1, the heat sink substrate 33 may be larger than the nest 19.

The test nest also is part of a system also used to perform various electrical measurements on both the read and write elements on the slider 13. Usually, electrical resistance and amplitude (change in resistance due to applied magnetic field) and noise are measured on the read element of slider 13, and resistance is measure on the write element of slider 13. The test element 23 extends the measurement system by: (1) detecting the flux generated by the write head when high frequency AC current is applied to the test element 23; and (2) detecting the voltage induced due to AC flux locally generated in the lithographically-designed coils in the test device 15. The test element 23 extends the test capability on the read element of the slider 13 by testing high frequency response (amplitude, asymmetry), which may be measured due to AC flux locally generated in the coils below test nest. This requires (a) electrical contact to be made to the write head on the slider; and/or (b) electrical contact to be made to the MR read head on the slider. Thus, the test nest itself may be used as a vehicle to more conveniently position the slider within a much larger test apparatus. The tests done are so-called "quasi-static" tests and use relatively large external coil to generate magnetic field. Only the read and write elements on the slider are tested.

The electrical contacts utilized may comprise needle-type probes that are pushed into contact with contact pads on the slider. The test device may or may not contain any probes, but allows the slider to be moved in a precise manner and to bring the pads on the slider in contact with the probes. Probes may be contained within the test device with the assistance of an additional mechanism to push the slider against them. An alternative to needle probes, are pads on a flex circuit that match those on the slider. Alternatively, these new tests may be performed independently of the regular electrical and magnetic quasi-static measurements.

The present invention has several advantages, including the ability to give the coil repeatable and controllable positioning with respect to the write element. The small size and low inductance of the coil allows excitation at higher frequencies that are currently achievable today. The position of the coil within the nest ensures good heat sinking and enables large current pulses to be employed. The very precise alignment gives good control of cross-talk between source and detector. This technique is especially useful for perpendicular heads where the magnetic write flux is less confined close to the pole tip.

While the invention has been shown or described in only some of its forms, it should be apparent to those skilled in the art that it is not so limited, but is susceptible to various changes without departing from the scope of the invention.

What is claimed is:

1. A test device for testing a workpiece, comprising:
   a body that defines x, y, and z directions;
   a nest having a rectangular, block-like shape formed in the body and having a platform extending in an x-y plane to define a z-direction stop, the nest having a reference corner that defines both x-direction and y-direction stops for precisely aligning the workpiece with respect to the nest in all of the x, y, and z-directions; and
   a test element formed in the body adjacent the nest, the test element being precisely located adjacent the reference corner for testing the workpiece when the workpiece is mounted in the nest and precisely aligned with respect to the reference corner at the x, y, and z-direction stops, and the test element is adapted to couple with and test the workpiece with a high frequency magnetic test field to detect stray flux from the workpiece.

2. The test device of claim 1, wherein the reference corner is adapted to align the workpiece within +/−5 µm of a desired alignment with respect to the test element in all of the x, y, and z-directions.

3. The test device of claim 1, further comprising an evacuated hole formed in the body and extending to the nest for securing the workpiece in the nest during testing.

4. The test device of claim 1, wherein the test element is selected from the group consisting of one or more coils, an array of coils, an array of loops, and an array of wires.

5. The test device of claim 1, further comprising a wear layer formed in the nest adjacent the test element for protecting the test element from wear, and wherein the wear layer is formed from $Al_2O_3$ and has a thickness of no more than 1 µm.

6. The test device of claim 1, further comprising a heat sink substrate formed in the body adjacent the test element but opposite the nest for cooling the body, test element, and workpiece in operation, and wherein the body is ceramic, the test element is copper, and the heat sink substrate is silicon.

7. The test device of claim 1, wherein the test element has 1 µm traces at a spacing of 1.5 µm for conducting approximately 50 mA to produce a magnetic field of approximately 200 Oe.

8. The test device of claim 1, further comprising a wear layer formed in the nest adjacent the test element for protecting the test element from wear, and wherein the wear layer is formed from $Al_2O_3$ and has a thickness of no more than 1 µm.

9. A system for testing a workpiece, comprising:

a workpiece that defines x, y, and z-directions;

a test device having a body, and a nest formed in the body having a reference corner that precisely aligns the workpiece with respect to the nest in all of the x, y, and z-directions;

a test element formed in the body beneath the nest, the test element being precisely located adjacent the reference corner for testing the workpiece when the workpiece is mounted in the nest and precisely aligned with respect to the reference corner;

a wear layer formed in the nest between the workpiece and the test element for protecting the test element from wear; and the test element couples with and tests the workpiece with a high frequency magnetic test field to detect stray magnetic flux from a magnetic write element of the workpiece.

10. The system of claim 9, wherein the reference corner is adapted to align the workpiece within +/−5 µm of a desired alignment with respect to the test element in all of the x, y, and z-directions.

11. The system of claim 9, further comprising an evacuated hole formed in the body and extending to the nest for securing the workpiece in the nest during testing.

12. The system of claim 9, wherein the test element is selected from the group consisting of one or more coils, an array of coils, an array of loops, and an array of wires.

13. The system of claim 9, wherein the wear layer is formed from $Al_2O_3$ and has a thickness of no more than 1 µm.

14. The system of claim 9, further comprising a heat sink substrate formed in the body adjacent the test element but opposite the nest for cooling the body, test element, and workpiece in operation, and wherein the body is ceramic, the test element is copper, and the heat sink substrate is silicon.

15. The system of claim 9, wherein the test element has 1 µm traces at a spacing of 1.5 µm for conducting approximately 50 mA to produce a magnetic field of approximately 200 Oe.

16. The system of claim 9, wherein the nest has a rectangular, block-like shape and the workpiece has a congruent shape.

17. The system of claim 9, wherein the workpiece is a hard disk drive slider, and the device assesses the write efficiency of a write element of the slider without flying the slider on a disk.

18. A test device for testing a workpiece, comprising:

a body that defines x, y, and z directions;

a nest formed in the body, the nest having a reference corner for precisely aligning the workpiece with respect to the nest in all of the x, y, and z-directions;

a test element formed in the body adjacent the nest, the test element being precisely located adjacent the reference corner for testing the workpiece when the workpiece is mounted in the nest and precisely aligned with respect to the reference corner;

a wear layer formed in the nest on top of the test element for protecting the test element from wear;

a heat sink substrate formed in the body adjacent the test element but opposite the wear layer for cooling the body and test element in operation, and wherein the body is ceramic, the test element is copper, and the heat sink substrate is silicon; and an evacuated hole formed in the body and extending to the nest for securing the workpiece in the nest during testing.

19. The test device of claim 18, wherein the test element is selected from the group consisting of one or more coils, an array of coils, an array of loops, and an array of wires.

20. A test device for testing a workpiece, comprising:

a body that defines x, y, and z directions;

a nest having a rectangular, block-like shape formed in the body and having a platform extending in an x-y plane to define a z-direction stop, the nest having a reference corner that defines both x-direction and y-direction stops for precisely aligning the workpiece with respect to the nest in all of the x, y, and z-directions;

a test element formed in the body adjacent the nest, the test element being precisely located adjacent the reference corner for testing the workpiece when the workpiece is mounted in the nest and precisely aligned with respect to the reference corner at the x, y, and z-direction stops; and a heat sink substrate formed in the body adjacent the test element but opposite the nest for cooling the body, test element, and workpiece in operation, and wherein the body is ceramic, the test element is copper, and the heat sink substrate is silicon.

21. The test device of claim 20, wherein the reference corner is adapted to align the workpiece within +/−5 μm of a desired alignment with respect to the test element in all of the x, y, and z-directions.

22. The test device of claim 20, further comprising an evacuated hole formed in the body and extending to the nest for securing the workpiece in the nest during testing.

23. The test device of claim 20, wherein the test element is selected from the group consisting of one or more coils, an array of coils, an array of loops, and an array of wires.

24. The test device of claim 20, further comprising a wear layer formed in the nest adjacent the test element for protecting the test element from wear, and wherein the wear layer is formed from $Al_2O_3$ and has a thickness of no more than 1 μm.

25. The test device of claim 20, wherein the test element has 1 μm traces at a spacing of 1.5 μm for conducting approximately 50 mA to produce a magnetic field of approximately 200 Oe.

\* \* \* \* \*